United States Patent [19]

Symons

[11] Patent Number: 5,309,690
[45] Date of Patent: May 10, 1994

[54] COMPOSITE PANEL

[75] Inventor: Michael W. Symons, Pretoria, South Africa

[73] Assignee: Plascon Technologies (Proprietary) Limited, Transvaal, South Africa

[21] Appl. No.: 50,778

[22] Filed: Apr. 22, 1993

[30] Foreign Application Priority Data

Apr. 22, 1992 [ZA] South Africa .................. 92/2902

[51] Int. Cl.⁵ .............................................. E04C 1/00
[52] U.S. Cl. ..................................... 52/309.9; 52/806; 52/809; 428/73; 428/116
[58] Field of Search .............. 52/309.6, 309.9, 309.1, 52/404, 785, 790, 795, 799, 806, 808, 809; 428/73, 116, 117, 118

[56] References Cited

U.S. PATENT DOCUMENTS 3,364,097  1/1968  Dunnington .
3,998,024 12/1976  Frandsen .

FOREIGN PATENT DOCUMENTS 390536 10/1990 European Pat. Off. .
2550313  2/1985 France .
2144675  3/1985 United Kingdom .

Primary Examiner—Carl D. Friedman
Assistant Examiner—Creighton Smith
Attorney, Agent, or Firm—Cushman, Darby & Cushman

[57] ABSTRACT

A composite panel comprises first and second sheets 20, 22 of a natural fibre material such as corrugated cardboard, each sheet 20, 22 having been impregnated with a liquid composition comprising a thermosetting resin, an extending liquid for the thermosetting resin and a catalyst for the thermosetting resin, the thermosetting resin having been polymerized, a cellular core 10 of a natural fibre material such as kraft paper, the cellular core 10 having been impregnated with a liquid composition comprising a thermosetting resin, an extending liquid for the thermosetting resin and a catalyst for the thermosetting resin, the thermosetting resin having been polymerized, the cellular core 10 being sandwiched between and adhered to the first and second sheets 20, 22; and a filler composition located in all of the cells of the core 10, the filler composition comprising a mixture of an inorganic insulating material and a material which releases water at elevated temperatures, in granular form. The composite panel is an acoustic absorber and thermal insulator and is fire resistant.

12 Claims, 6 Drawing Sheets

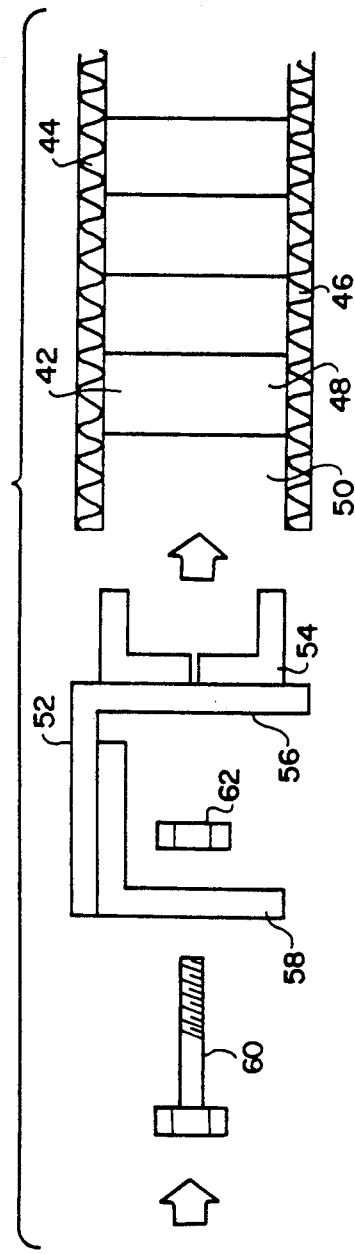
FIG. 10
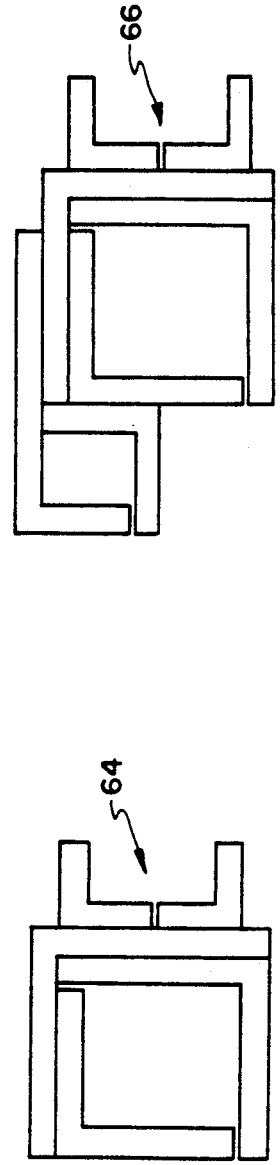
FIG. 12
FIG. 11

COMPOSITE PANEL

BACKGROUND OF THE INVENTION

This invention relates to a composite panel and to a method of making the composite panel, which composite panel may be used as a building panel.

Many types of dry wall partitioning and exterior wall sheathing are known. Examples of the materials used to construct these include plywood, wood particle or fibre board, gypsum board, and fiber reinforced cement board, which may be secured to timber, galvanized steel or extruded aluminum studding or framing and which may include fibre glass, mineral wool, polymer foam or similar cavity installed insulation.

Exterior wall sheathing, dry wall partitioning and building panels made of these materials are not generally factory-prefabricated, because the resulting panel structures would be too heavy to allow for site handling without expensive equipment.

There is a need for a new type of composite panel with a good strength to weight ratio, which is constructed of materials which have the necessary stiffness, impact resistance and ease of decoration, which is an acoustic absorber and thermal insulator and which is fire resistant.

SUMMARY OF THE INVENTION

According to a first aspect of the invention there is provided a composite panel comprising first and second sheets of a natural fibre material each sheet having being impregnated with a liquid composition comprising a thermosetting resin, an extending liquid for the thermosetting resin and a catalyst for the thermosetting resin, the thermosetting resin having being polymerized, a cellular core of a natural fibre material sandwiched between and adhered to the first and second sheets, and a filler composition located in all of the cells of the core, the filler composition comprising a mixture of an inorganic insulating material and a material which releases water at elevated temperatures, in dry granular form.

Preferably, the cellular core is comprised of a natural fibre material which has been impregnated with a liquid composition comprising a thermosetting resin, an extending liquid for the thermosetting resin and a catalyst for the thermosetting resin, the thermosetting resin having been polymerized.

Preferably, the liquid composition includes an additional flame resistant material.

The composite panel may include along an edge an elongate element adhered to the edge of the composite panel, and comprising a natural fibre material impregnated with a thermosetting resin, an extending liquid for the thermosetting resin and a catalyst for the thermosetting resin, the thermosetting resin having being polymerized. The elongate element may be designed to provide for the joining of one composite panel to another composite panel.

According to a second aspect of the invention there is provided a method of making a composite panel as described above which includes the steps of:
(a) adhering the cellular core to the first sheet;
(b) filling all of the cells of the core with the filler composition; and
(c) adhering the second sheet to the core remote from the first sheet to form the composite panel.

When the composite panel includes an elongate element along an edge, the method may include the step of:
(d) adhering the elongate element to the edge of the composite panel.

BRIEF DESCRIPTION OF THE DRAWINGS

FIG. 10 is a plan view of a composite panel of the invention including an elongate element;

FIGS. 11, 12 and 13 show various types of elongate elements for composite panels of the invention;

DESCRIPTION OF EMBODIMENTS

Figure 1:
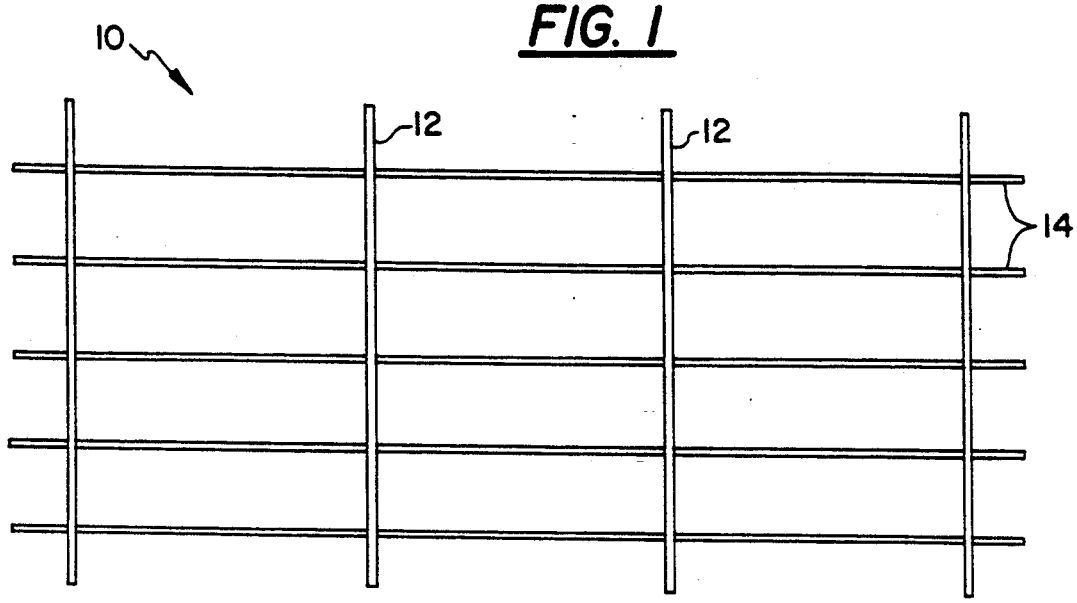
FIG. 1 is a plan view of a first cellular core for a composite panel of the invention.

The first embodiment of the invention is a composite panel. The first elements of the composite panel are first and second sheets of a natural fibre material which may be for example single or double walled corrugated cardboard, single or multiple kraft paper sheeting, wood pulp sheeting, and the like, impregnated with a liquid composition comprising a thermosetting resin, an extending liquid for the thermosetting resin and a catalyst for the thermosetting resin, the thermosetting resin having been polymerized to give the first and second sheets the required degree of rigidity.

The liquid compositions which may be used for this impregnation and the method of impregnation are disclosed in South African Patent No. 90/2260 to Plascon Technologies (Pty) Limited and are described below.

The method of impregnation and polymerization comprises:

(1) impregnating the sheets with the liquid composition, for example by vacuum pressure impregnation or by immersion;

(2) recovering the extending liquid by evaporation and recondensation; and (3) polymerizing the thermosetting resin, for example by subjecting the sheets to suitable conditions of temperature.

The liquid composition comprises a thermosetting resin, an extending liquid for the thermosetting resin and a catalyst for the thermosetting resin. Examples of various types of liquid compositions for use in this invention are given below.

It is desirable that the pre-catalysed thermosetting resin has an extended pot life, i.e. the period of time during which no significant viscosity change occurs in the resin mix. A pot life of 30 days to several months is desirable. This may be achieved by suitable selection of the thermosetting resin and the extending liquid and the catalyst. The thermosetting resin, once pre-catalysed, may also be kept at a low temperature, for example below 10° C. to extend the pot life.

The extending liquid has other important functions which are to provide variability as to the weight of the resin to be impregnated into the sheets by controlling the percentage of resin in the liquid composition and to control resin viscosity, not to interfere with polymerisation and to be easily removed from the impregnated material.

The thermosetting resin may be a phenolic resin (phenol formaldehyde resol resin), preferably a liquid phenolic resin, which can be polymerized at room temperature or elevated temperature. Examples of suitable phenolic resins include:

Polylam 2432 from National Chemical Products Limited of Germiston, South Africa, which is a liquid phenolic resin designed to cure at room temperature with an acidic catalyst such as a blend of sulfonic acids such as Catalyst VX-21 of National Chemical Products Limited;

Cellobond J2027L, J2018L, J20/1096L and J20/1081L from British Petroleum Company plc, which may be catalysed with a catalyst such as Phencat 10, Phencat 15, or the VCM90 from British Petroleum Company plc or VX-21 from National Chemical Products Limited;

A phenol-furfural resin catalysed with hexamethylene tetramine;

A blend of a phenolic resin with a melamine formaldehyde or a urea formaldehyde resin.

Suitable extending liquids for use with phenolic resins are true solvents of the resin and are non-reactive. Typical examples include water; $C_1$-$C_4$ alcohols such as methanol, ethanol, propanol and butanol; acetone and methylethyl ketone.

The thermosetting resin may also be a liquid polyester resin such as the unsaturated isophthalic or orthophthalic liquid polyester resins. Examples of these are those manufactured by Scott Bader of England including Crystic 272 catalysed by catalyst powder B and Crystic 196, and those under the Atlac brand by DSM.

Other suitable polyester resins are those produced by National Chemical Products, Germiston, South Africa, such as Polylite 33410, Polylite 8130, Polylite 8000 and Polylite 8382X. Suitable latent catalysts for these resins include di-tert-butyl peroxy 3.3.5 tri-methylcyclohexane in dibutyl phthalate such as those sold by Akzo Chemie under the name Triganox 29B240, Lucidol KL50, Triganox 21, Triganox C or Triganox K-70, benzoyl peroxide formulations, t-butyl perbenzoate sold by Interox under codes TBTB and TBPB, dibenzoyl peroxide sold by Interox under code M1KP NA1; or t-butyl-2-perethylhexanoate. These catalysts generally trigger polymerisation at a temperature in the region of 60° C. upwards, more typically 80° C. upwards.

Suitable extending liquids for use with polyester resins include halogenated hydrocarbons such as dichloromethane, trichloroethylene, perchloroethylene, trichlorobromine, trichloroethane, trichlorotrifluoroethane, carbon tetrachloride, chloroform and trichlorofluoromethane; toluol; xylene; butyl acetate; cyclohexane; benzene; tetrahydrofuran; acetone and methylethyl ketone.

Another type of thermosetting resin which may be used are the liquid room temperature curing acrylic and methacrylic acid esters and methyl methacrylates, typically catalysed with benzoyl peroxide powders; and urea formaldehyde and melamine formaldehyde resins catalysed with acids, and which may have been internally plasticised with glycols.

The liquid composition may also include other components such as an inhibitor, an accelerator, a surfactant, e.g. a sulfosuccinate for use with phenolic resins or an alkyl aryl sulphonate for use with polyester or epoxy resins, and extending particles such as silica fume, micronised corundum, borosilicate and silicon dioxide.

There are two particularly preferred liquid compositions for the use in this invention. These liquid compositions are preferred because they have optimal pot life, they provide for suitable levels of resin impregnation into the materials to be impregnated, they provide for easy polymerisation of the thermosetting resin once impregnated, and the extending liquid is easily recovered.

The first preferred liquid composition comprises a phenolic resin, 20-200% by weight of the phenolic resin of an extending liquid which is a $C_1$-$C_4$ alcohol, i.e. methanol, ethanol, propanol or butanol, preferably methanol, and a catalyst for the phenolic resin, preferably an acidic catalyst such as a blend of an organic acid, e.g. a sulphonic acid and an inorganic acid, e.g. phosphoric or sulphuric acid.

The second preferred liquid composition comprises an unsaturated polyester resin preferably a polyester resin, 20-200% by weight of the resin of an extending liquid which is selected from dichloromethane, trichloroethylene, perchloroethylene, trichlorobromine, trichlorotrifluoroethane and fluorotrichloromethane, preferably dichloromethane, and a suitable catalyst such as t-butyl perbenzoate, or preferably t-butyl-2-perethylhexanoate.

The sheets and the elements of the panel may be impregnated with the liquid composition in any suitable manner. One suitable method will now be described.

Given that the first and second sheets of a natural fibre material have a large surface area to volume or mass ratio, as does the cellular core, impregnation with the liquid composition is easily achieved by immersion. Consequently the different elements of the composite panel which are in sheet form are preferably treated from a reel passing continuously first through an immersion bath containing the liquid composition in which the dwell time is from 1-10 minutes, preferably 2-4 minutes, then under a hooded extending liquid evaporation section followed by a heated section to polymerise the resin, is then cut to length, then passed through a glue spreader, applying preferably the same resin as is used in impregnation suitably modified rheologically to serve as a glue, and finally into the composition panel make-up procedure.

Where the first and second sheets or the core material are in made-up form such as corrugated board, then immersion would be in suitable baskets or holders followed by batch evaporation and polymerization.

The second element of the composite panel is a cellular core of a natural fibre material. Each cell of the cellular core may be of triangular, hexagonal, rectangular, square or elliptical cross-section, and the cellular core may be made of corrugated cardboard or kraft paper or a combination, and is preferably impregnated with a liquid composition comprising a thermosetting resin, and extending liquid for the thermosetting resin and a catalyst for the thermosetting resin, the thermosetting resin having been polymerized, to give the cellular core the required degree of rigidity. Again, the liquid compositions which may be used for the impregnation and the method of impregnation are disclosed in South African Patent No. 90/2260 to Plascon Technologies (Pty) Limited and are described above.

The cellular core is sandwiched between and adhered to the first and second sheets. The method of adhesion may be the use of a suitable glue.

The cells of the core are filled with a filler composition comprising a mixture of an inorganic insulating material and a material which releases water at elevated temperatures, in granular form.

The inorganic insulating material is preferably selected from the group consisting of exfoliated vermiculite, expanded perlite, mineral wool, expanded clay, expanded fly ash, glass fibre, expanded graphite, expanded silicate, zeolite or glass foam, or a mixture of two or more thereof, more preferably exfoliated vermiculite or expanded perlite or a mixture thereof. These materials provide an insulating and fire-proof filling for the open cellular core of the composite panel.

The material which releases water at elevated temperatures may be selected from aluminium trihydrate, the alkali metal salts of silicates, unexfoliated vermiculite, hydrated phosphates, borosilicates or borates, aluminium hydroxides, cyanuric acid derivatives and analogues, aluminohydrocalcites, artinite, hydracalumite, hydroganate, hydromagnesite, and aluminium hydrated oxides, all of which release water, either crystalline or of hydration, at elevated temperatures. In addition, some of these materials intumesce, exfoliate or foam to increase in volume and so form an insulating mass when heated to above 150° C. more usually to 500° C. or more, which occurs if there is a fire. The primary effect of these materials is to minimise the temperature in the composite panel in the event of a fire. The preferred material is the alkali metal salts of silicates, preferably sodium silicate, or a mixture thereof with aluminium trihydrate. The alkali metal salts of silicates serve also to fuse the granular mass together after intumescence at elevated temperatures.

Preferably, the inorganic insulating material is mixed with the material which releases water in a weight ratio of from 1 to 8 to 1 to 2, to provide the filler composition in granular form for filling the cells of the core.

In addition, a suitable flame resistant or flame retardant material may be included in the liquid composition used to impregnate the first and second sheets and/or the cellular core, or in a coating composition used to decorate the panel. The flame resistant material may be selected from borates, phosphates, nitrogen compounds such as diammonium phosphate and halogen-containing compounds. Other suitable compounds are the phosphoric acid donors which include red phosphorus, organic or inorganic phosphorus-containing compounds such as the alkali phosphates and in particular the amine salts or ammonium salts of phosphoric acids. An example of a suitable flame resistant material is Reoflam DMMP by Ciba Geigy which is dimethylmethylphosphonate containing over 25% of phosphorus.

Figure 2:
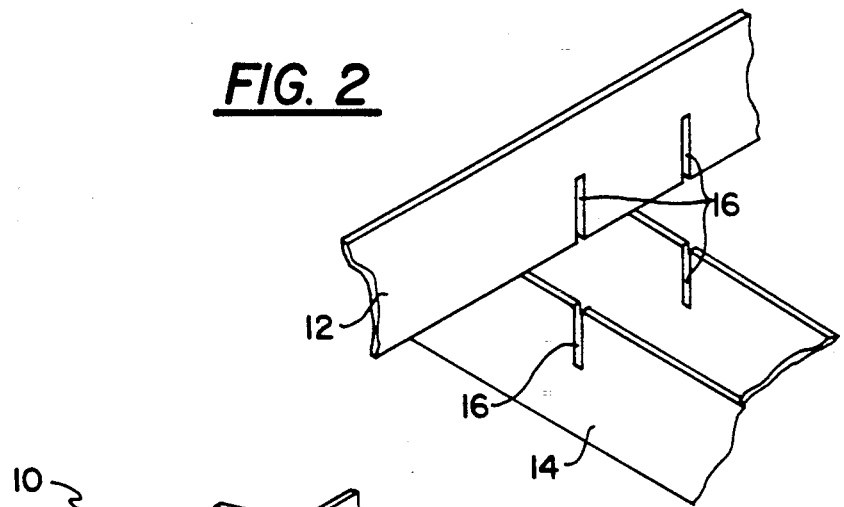
FIG. 2 is a view of the core of FIG. 1 illustrating its method of assembly.
Figure 3:
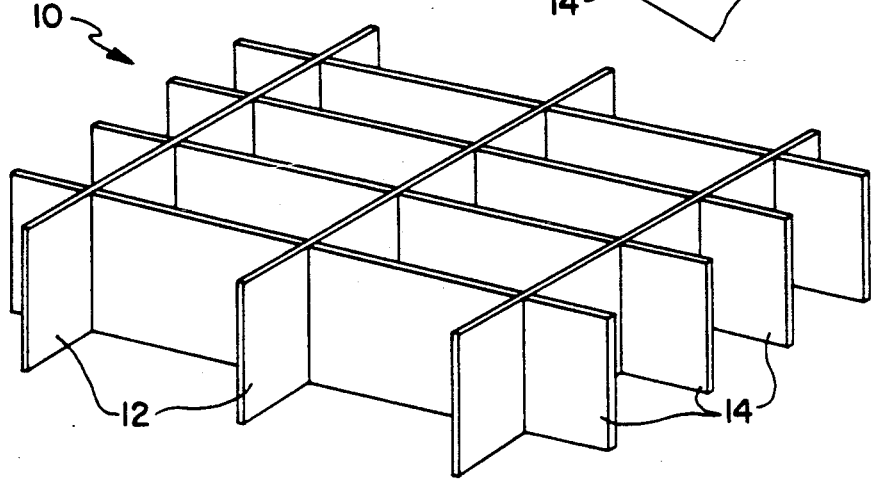
FIG. 3 is a perspective view of the core FIG. 1.

Turning now to the drawings, referring to FIGS. 1-3 of the drawings, there is shown a cellular core 10 made from a first set of elements 12 and a second set of elements 14, which elements 12, 14 are slotted at 16 to create a grid structure as illustrated. The elements 12, 14 may be made from impregnated kraft paper.

Figure 4:
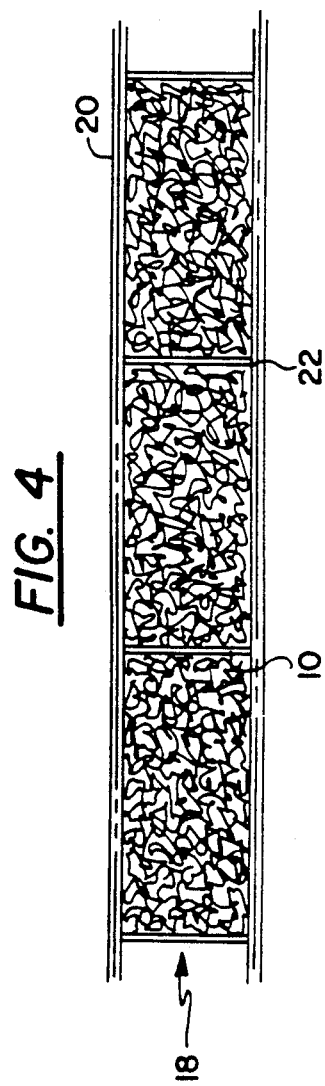
FIG. 4 is a sectional side view of a composite panel of the invention using the core of FIGS. 1-3.

Referring to FIG. 4 there is shown a composite panel 18 comprising a first sheet 20 and a second sheet 22 formed from impregnated corrugated cardboard or kraft paper, and sandwiched therebetween a core 10. Each cell of the core 10 is filled with a filler composition comprising exfoliated vermiculite treated with an alkali silicate solution and allowed to dry before filling the cells, preferably a sodium silicate with a soda to silicate ratio of 3 or greater. The core 10 is adhered to the first sheet 20 and to the second sheet 22 with a conventional glue.

The construction of the composite panel 18 with the two sheets 20, 22 having the core 10 sandwiched therebetween with each cell filled with the filler composition, provides a composite panel with a sufficient degree of rigidity, while the filling of the cells of the core 10 with the filler composition provides acoustical absorbance, thermal insulation and fire resistance. The fact that the core is a cellular core means that the filler composition is equally and fully distributed throughout the composite panel, thus preventing the formation of empty spaces which might provide a flame path. Further, when the filler composition comprises for example exfoliated vermiculite treated with an alkali silicate, should a fire occur, the silicate fraction foams or intumesces at approximately 420° C. and there is a release of water by cleavage which also results in foaming. This serves to adhere the exfoliated vermiculite, preventing it from falling from the panel once the fire exposed face has been subjected to burnthrough. In addition, the cell structure hinders distortion of the panel when one side of the panel is heated by fire. Further in a fire the cell walls tend to carbonize which renders them insulating.

Figure 5:
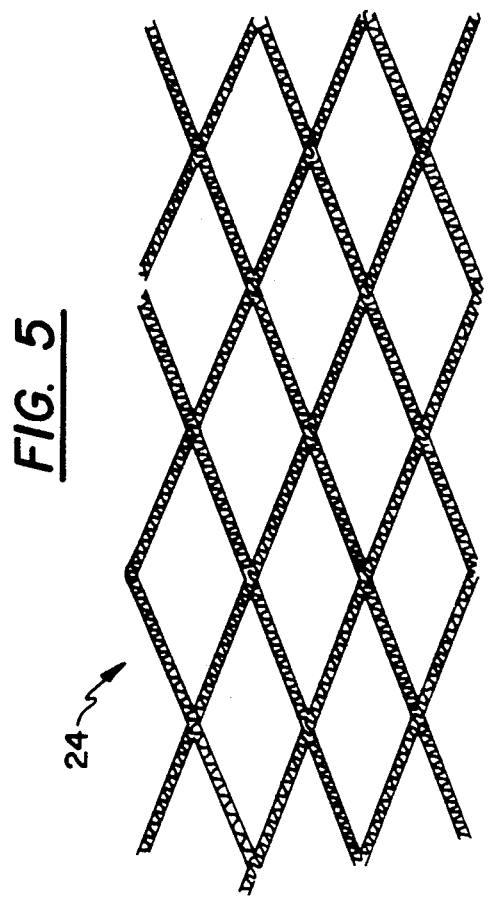
FIG. 5 is a plan view of a second core for a composite panel of the invention.

Referring to FIG. 5 there is shown a second core 24 made from corrugated cardboard lined on both sides with kraft paper, adjacent sheets of the material being adhered to each other at points to form a cellular structure.

Figure 6:
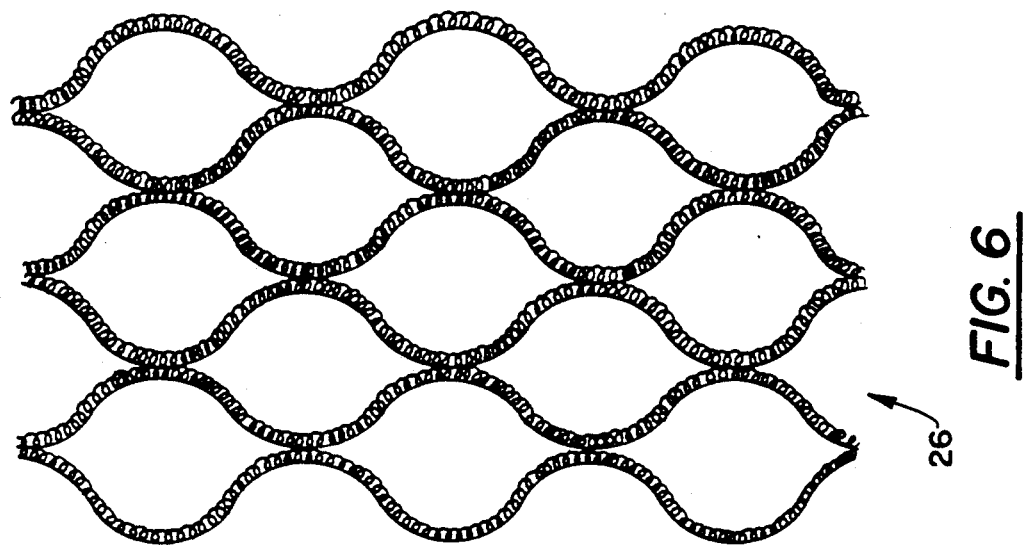
FIG. 6 is a plan view of a third core for a composite panel of the invention.

Referring to FIG. 6 there is shown a third core 26 formed from corrugated cardboard lined on one side only by kraft paper, adjacent sheets being adhered to each other at points to form the cellular structure as shown.

Figure 7:
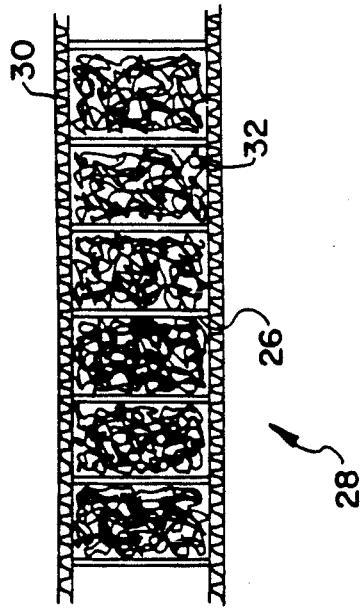
FIG. 7 is a sectional side view of a composite panel of the invention using the core of FIG. 6.

Referring to FIG. 7 there is shown a composite panel 28 comprising a first sheet 30 and a second sheet 32 formed from corrugated cardboard impregnated with a liquid composition, and having sandwiched therebetween a core 26, each of the cells of the core 26 being filled with a filler composition as described above.

Figure 8:
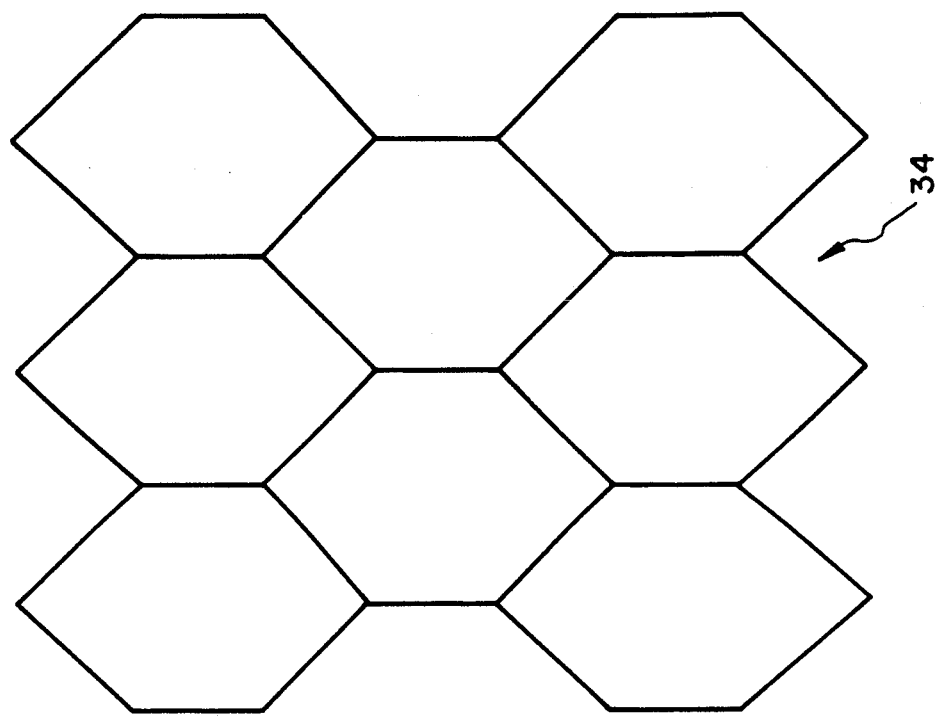
FIG. 8 is a plan view of a fourth core for a composite panel of the invention.

Referring to FIG. 8 there is shown a fourth core 34 comprised of kraft paper which may be either single ply or multiply and designed with hexagonal cells.

Figure 9:
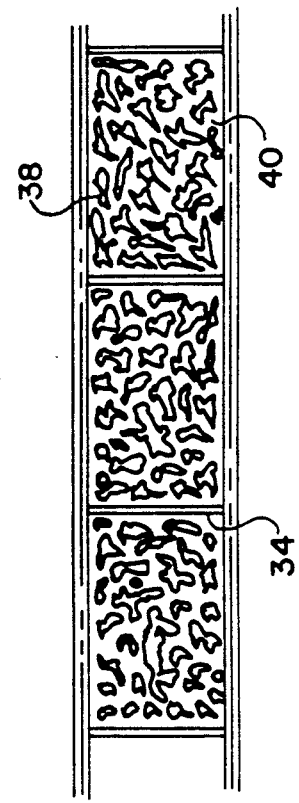
FIG. 9 is a sectional side view of a composite panel of the invention using the core of FIG. 8.

Referring to FIG. 9 there is shown a composite panel 36 comprising a first sheet 38 and a second sheet 40 of a multiply kraft paper impregnated with a liquid composition, having sandwiched therebetween a core 34, each of the cells of the core 34 being filled with the filler composition, for example comprising sodium silicate coated perlite in which is included aluminium trihydrate. Aluminium trihydrate is such that water cleavage commences at approximately 150° C., thus maintaining the filler composition at a low temperature as a function of water evaporation, taking its latent heat of vaporization from the filler composition itself. Additionally, this release of water promotes intumescence of the sodium silicate at higher temperatures.

Referring to FIG. 10 there is shown a composite panel 42 comprised of a first sheet 44 and a second sheet 46 of a suitably impregnated corrugated cardboard or multiply kraft paper, having sandwiched therebetween a core 48, of the cells of which contain a filler composition as described above. There is designed to be fitted to an edge 50 of the composite panel 42, an elongate element indicated generally at 52. A portion 54 of the elongate element 52 is designed to fit into, or between the first and second sheets 44, 46 and may be adhered to the first and second sheets 44, 46, for example by a suitable glue. The area between the composite panel 42 and the part 54 of the elongate element 52 is filled with the filler composition. In addition the interior of the elongate element 52, between the portions 56, 58 and 60, is filled either with the filler composition or with a silicone fireproof sealing foam such as 3-65 48 Silicon RTV Foam by Dow Corning.

Attached to the part 54 of the elongate element 52 are additional parts 56, 58, 60 designed to allow for attachment of the composite panel 42 to an adjacent composite panel, by means of a bolt 60 and nut 62 in a conventional manner.

The various parts of the elongate element 52 may be made from multi-laminates of kraft paper, pre-glued together or wood or wood derived products.

Figure 13:
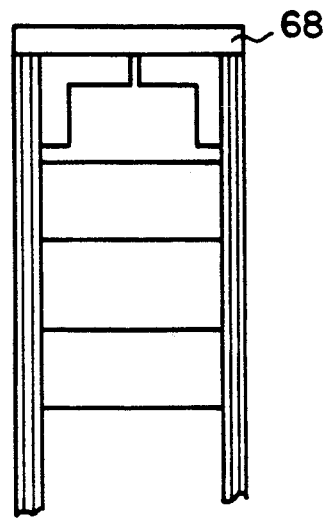

Referring to FIG. 11 there is shown an elongate element 64 like the elongate element 52, but fully assembled. Referring to FIG. 12 there is shown a further version of an elongate element 66, which may be used as a door frame, and referring to FIG. 13 there is shown another form of an elongate element 68 which may be used as a top or bottom frame for a composite panel.

Figure 14:
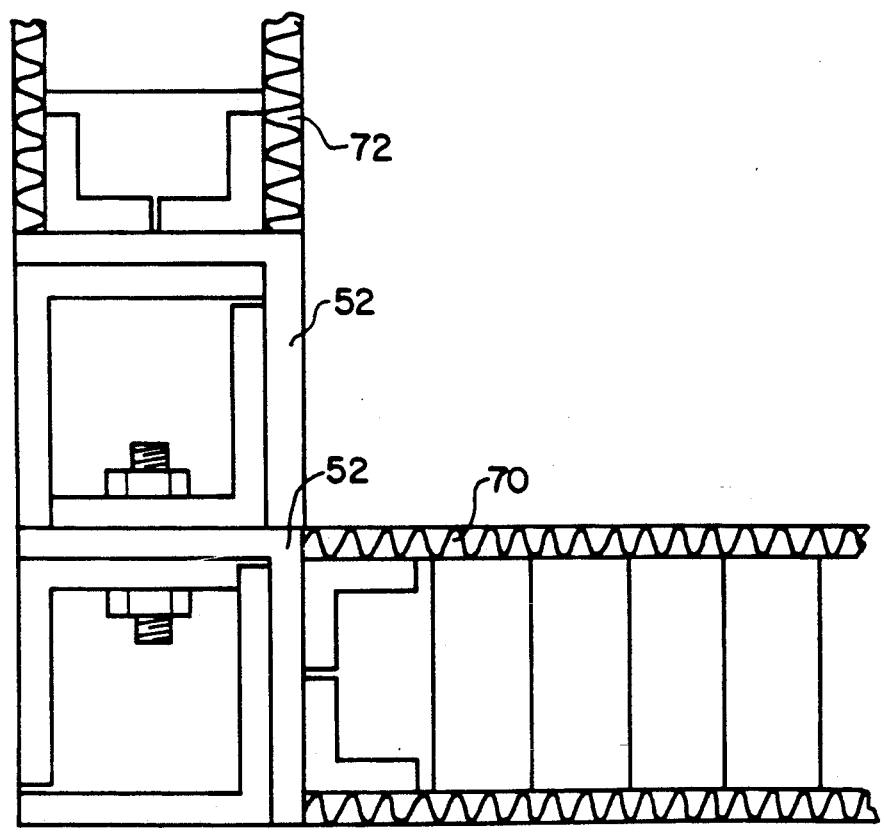
FIGS. 14, 15 and 16 show methods of joining two, three or four composite panels of the invention to one another.

Referring to FIG. 14 there is shown a method of joining a first composite panel 70 to a second composite panel 72 using elongate elements as illustrated in the preceding FIGS. 10 and 11.

Figure 15:
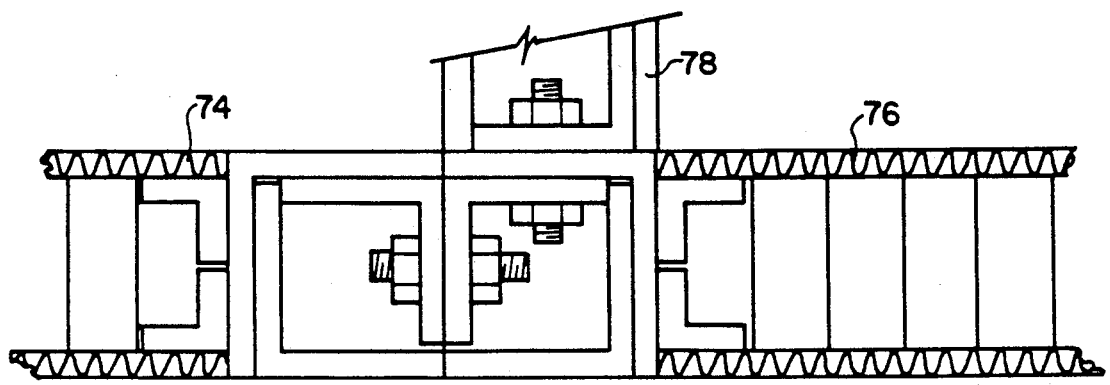
Figure 16:
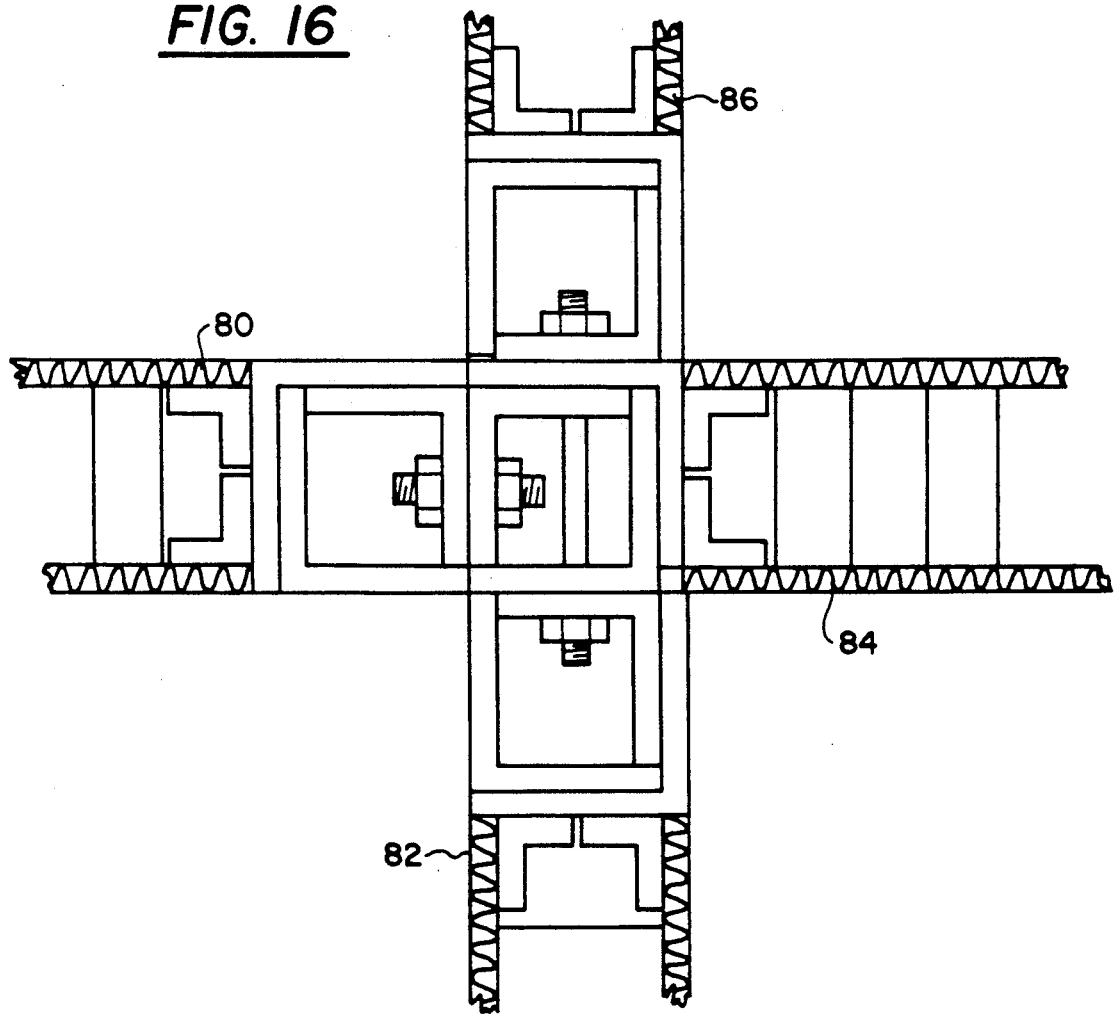

Referring to FIG. 15 there is shown a method of joining three composite panels 74, 76 and 78 to one another in a similar manner to that shown in FIG. 14, and referring to FIG. 16 there is shown a method of joining four panels 80, 82, 84 and 86 to one another in a similar manner to that illustrated in FIG. 14.

The advantages of the composite panel of the invention are that it has good fire resistance, good thermal insulation properties, good acoustic absorption or sound attenuation properties, has a high strength to weight ratio, is light, and provides surfaces that are easy to decorate, and is easy to assemble. The resistance to fire of the composite panel is a function of the properties of the filler composition, particularly the inorganic insulation material, when treated with the material which releases water.

In addition, an advantage of the composite panel of the invention is that it may easily be assembled on site.

I claim:

1. A composite panel comprises first and second sheets of a natural fibre material, each sheet having been impregnated with a liquid composition comprising a thermosetting resin, an extending liquid for the thermosetting resin and a catalyst for the thermosetting resin, the thermosetting resin having being polymerized, a cellular core of a natural fibre material sandwiched between and adhered to the first and second sheets, and a filler composition located in all of the cells of the core, the filler composition comprising a mixture of an inorganic insulating material and a material which releases water at elevated temperatures, in dry granular form.

2. A composite panel according to claim 1 wherein the cellular core is comprised of a natural fibre material which has been impregnated with a liquid composition comprising a thermosetting resin, an extending liquid for the thermosetting resin and a catalyst for the thermosetting resin, the thermosetting resin having been polymerized.

3. A composite panel according to claim 1 wherein the liquid composition includes an additional flame resistant material.

4. A composite panel according to claim 1 which includes an elongate element along an edge of the composite panel, the elongate element being adhered to the edge of the composite panel and comprising a natural fibre material impregnated with a liquid composition comprising a thermosetting resin, an extending liquid for the thermosetting resin and a catalyst for the thermosetting resin, the thermosetting resin having been polymerized.

5. A composite panel according to claim 1 wherein the first and second sheets of a natural fibre material are selected from the group consisting of single walled corrugated cardboard, double walled corrugated cardboard, single or multiple kraft paper sheeting, and wood pulp sheeting.

6. A composite panel according to claim 1 wherein the cellular core of a natural fibre material is selected from the group consisting of single walled corrugated cardboard, double walled corrugated cardboard, and single or multiple kraft paper sheeting.

7. A composite panel according to claim 1 wherein the cellular core is adhered to the first and second sheets by means of a suitable glue.

8. A composite panel according to claim 1 wherein the inorganic insulating material is selected from the group consisting of exfoliated vermiculite, expanded perlite, mineral wool, expanded clay, expanded fly ash, glass fibre, expanded graphite, expanded silicate, zeolite, and glass foam, and mixture of two or more thereof.

9. A composite panel according to claim 8 wherein the inorganic insulating material is selected from the group consisting of exfoliated vermiculite, expanded perlite or a mixture thereof.

10. A composite panel according to claim 1 wherein the material which releases water at elevated temperatures is selected from the group consisting of aluminium trihydrate, the alkali metal salts of silicates, unexfoliated vermiculite, hydrated phosphates, hydrated borosilicates, hydrated borates, aluminium hydroxides, cyanuric acid derivatives and analogues, alumino-hydrocalcites, artinite, hydracalumite, hydroganate, hydromagnesite, and aluminium hydrated oxides, and mixtures of two or more thereof.

11. A composite panel according to claim 10 wherein the material which releases water at elevated temperatures is selected from the group consisting of the alkali metal salts of silicates or a mixture thereof with aluminium trihydrate.

12. A composite panel according to claim 1 wherein the inorganic insulating material is mixed with the material which releases water at elevated temperatures in a weight ratio of from 1 to 8 to 1 to 2.

* * * * *